(12) United States Patent
Cha

(10) Patent No.: US 10,686,480 B2
(45) Date of Patent: Jun. 16, 2020

(54) MOBILE TERMINAL

(71) Applicant: LG ELECTRONICS INC., Seoul (KR)

(72) Inventor: Youngdo Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/473,959

(22) PCT Filed: Dec. 29, 2016

(86) PCT No.: PCT/KR2016/015462
§ 371 (c)(1),
(2) Date: Jun. 26, 2019

(87) PCT Pub. No.: WO2018/124338
PCT Pub. Date: Jul. 5, 2018

(65) Prior Publication Data
US 2019/0341953 A1 Nov. 7, 2019

(51) Int. Cl.
*H04B 1/38* (2015.01)
*H04B 1/3818* (2015.01)
*H04M 1/02* (2006.01)

(52) U.S. Cl.
CPC .......... *H04B 1/3818* (2015.01); *H04M 1/026* (2013.01); *H04M 1/0237* (2013.01)

(58) Field of Classification Search
CPC ........................ H04M 1/0202; H04B 1/3833
USPC .......... 455/558, 575.1, 573, 90.3; 429/90, 7, 429/149; 235/441; 206/307.1; 439/68; 708/490
See application file for complete search history.

(56) References Cited

U.S. PATENT DOCUMENTS

| 2008/0099559 A1* | 5/2008 | Lo ..................... G06K 19/07741 235/441 |
| 2008/0182622 A1* | 7/2008 | Makarowski ......... G06F 1/1613 455/558 |

(Continued)

FOREIGN PATENT DOCUMENTS

| JP | 2014-182920 A | 9/2014 |
| JP | 2015-27009 A | 2/2015 |

(Continued)

*Primary Examiner* — Kiet M Doan
(74) *Attorney, Agent, or Firm* — Birch, Stewart, Kolasch & Birch, LLP

(57) ABSTRACT

A mobile terminal further comprises: a case having an opening formed therethrough so as to communicate with the inside thereof; and a card tray inserted in the opening, wherein the card tray further comprises a cover part for covering the opening; a support part positioned inside the opening and comprising a seating part on which a card is stably placed; and a flexible part connecting the support part and the cover part and fitted/coupled to the circumference of the opening. The mobile terminal wherein the relative position of the cover part to the support part changes with morphological changing of the flexible part allows the positions of the cover part and the support part in the card tray to be flexibly variable. Therefore, even when positions of the opening and a card socket are mismatched, a card can be mounted in the mobile terminal, thus reducing an initial detective rate and an operationally detective rate.

5 Claims, 9 Drawing Sheets

(56) References Cited

U.S. PATENT DOCUMENTS

2016/0234362 A1\* 8/2016 Moon ................ H04M 1/0202
2017/0170584 A1\* 6/2017 Yang ..................... G06K 13/00

FOREIGN PATENT DOCUMENTS

| JP | 2015-106554 A | 6/2015 |
|---|---|---|
| JP | 2016-81808 A | 5/2016 |
| KR | 10-2013-0142085 A | 12/2013 |

\* cited by examiner

FIG. 2
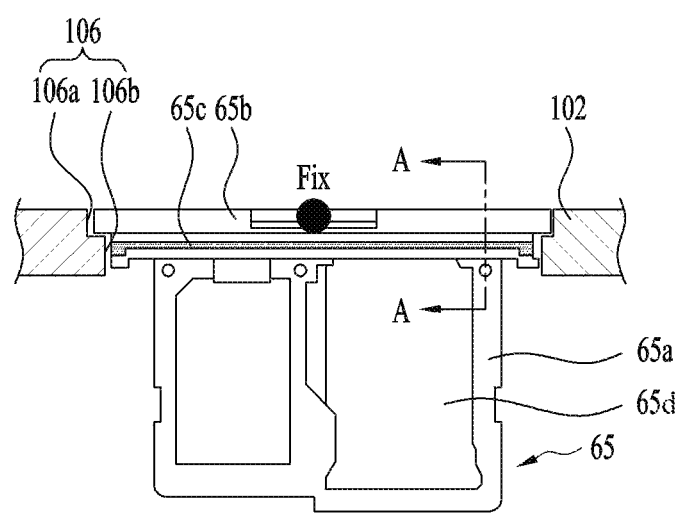
(a)
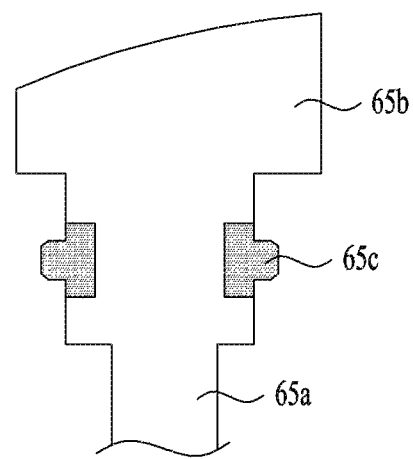
(b)

FIG. 5
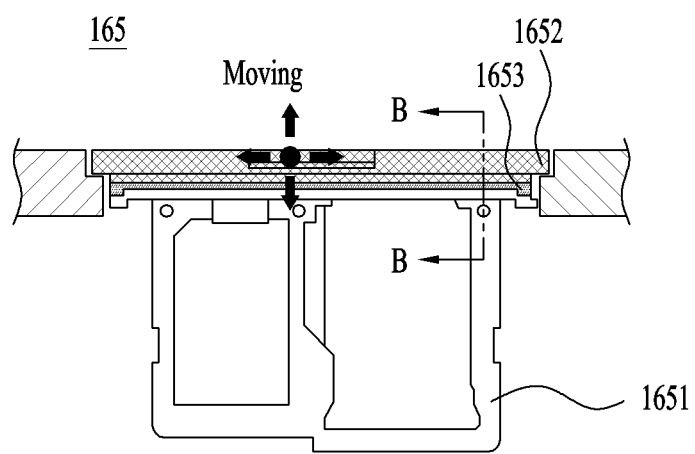
(a)
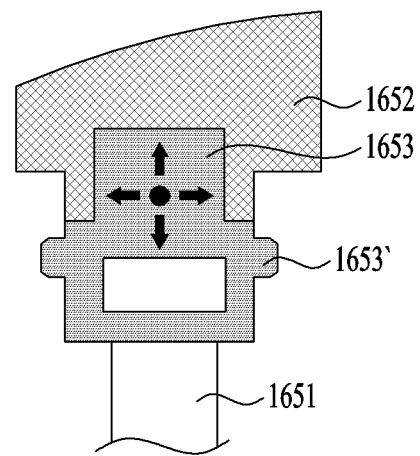
(b)

FIG. 6
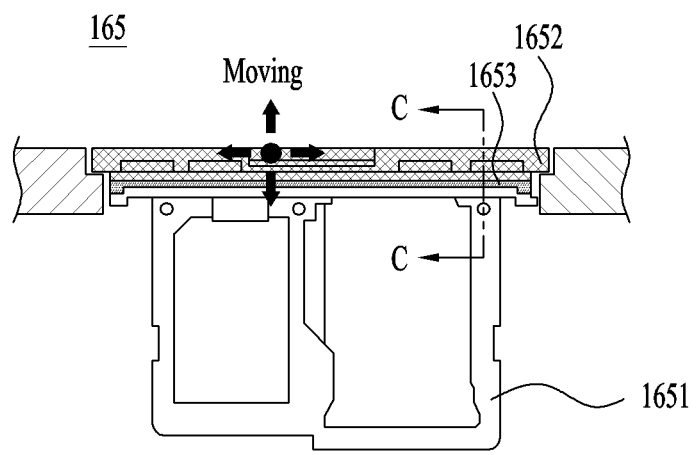
(a)
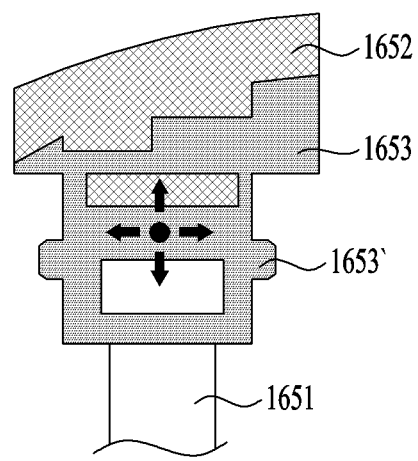
(b)

MOBILE TERMINAL

CROSS-REFERENCE TO RELATED APPLICATION

This application is the National Phase of PCT International Application No. PCT/KR2016/015462, filed on Dec. 29, 2016, all of which is hereby expressly incorporated by reference into the present application.

BACKGROUND OF THE INVENTION

Field of the Invention

Embodiments of the present disclosure relate to a mobile terminal having a card tray.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

With the diversified functions of the mobile terminal, a memory card configured to expand storage or a SIM card configured to have a user's personal identification may be additionally loaded in the mobile terminal to expand the functions. Thus, such the mobile terminal requires a structure configured open and close such the card. In case the mobile terminal includes a detachable rea cover, the user can open the rear cover and insert such the card. Unless it has the rear cover, the mobile terminal may additionally include an opening for inserting the card.

The mobile terminal may further include a card tray configured to support the card inserted through the opening to stably connect the card with a main board loaded in the mobile terminal. Such a closable card tray might fail to be inserted properly if a tolerance occurs between internal components and a case during the assembly process of the mobile terminal and thus an error rate might rise disadvantageously.

SUMMARY OF THE INVENTION

To overcome the disadvantages, an object of the present invention is to address the above-noted and other problems and provide a mobile terminal which may reduce an error rate by varying positions of a cover part and a support part of a card tray.

To achieve these objects and other advantages and in accordance with the purpose of the embodiments, as embodied and broadly described herein, a mobile terminal comprises a case comprising an opening that communicates with an inner space; a card tray inserted in the opening, wherein the card tray comprises a cover part configured to cover the opening; a support part provided in the opening and comprising a disposing portion in which a card is disposed; and a flexible part provided to connect the support part and the cover part with each other and configured to be insertedly fitted to a circumference of the opening, and when the shape of the flexible part is varied, relative positions of the cover part and the support part are varied.

One surface of the cover part and one surface of the case may form the same plane, and the other surface of the cover part may have an uneven area to couple the cover part to the flexible part.

The cover part and the flexible part may be bonded to each other.

The cover part and the flexible part and the support part and the flexible part may be double-injection molded to each other.

The mobile terminal may further comprise a card socket loaded in the case to be located in the opening, wherein the card socket comprises an accommodating portion formed in a corresponding shape to the support part.

A step may be formed in a lateral surface of the opening and an outer area is larger than an inner area of the opening. The flexible part may be insertedly fitted to the inner area of the opening.

Advantageous Effects

Accordingly, the embodiments have following advantageous effects. According to the embodiments of the present disclosure, the mobile terminal may reduce an error rate by varying positions of a cover part and a support part of a card tray. Accordingly, even if the position of the card socket becomes loose, the card is able to be loaded in the mobile terminal and then an initial error rate and an error rate caused during the usage of the mobile terminal may be reduced.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 2 is a diagram illustrating a conventional card tray;

FIGS. 5 and 6 are diagrams illustrating the card tray of FIG. 4; and

DETAILED DESCRIPTION OF THE EMBODIMENTS

Figure 1A:
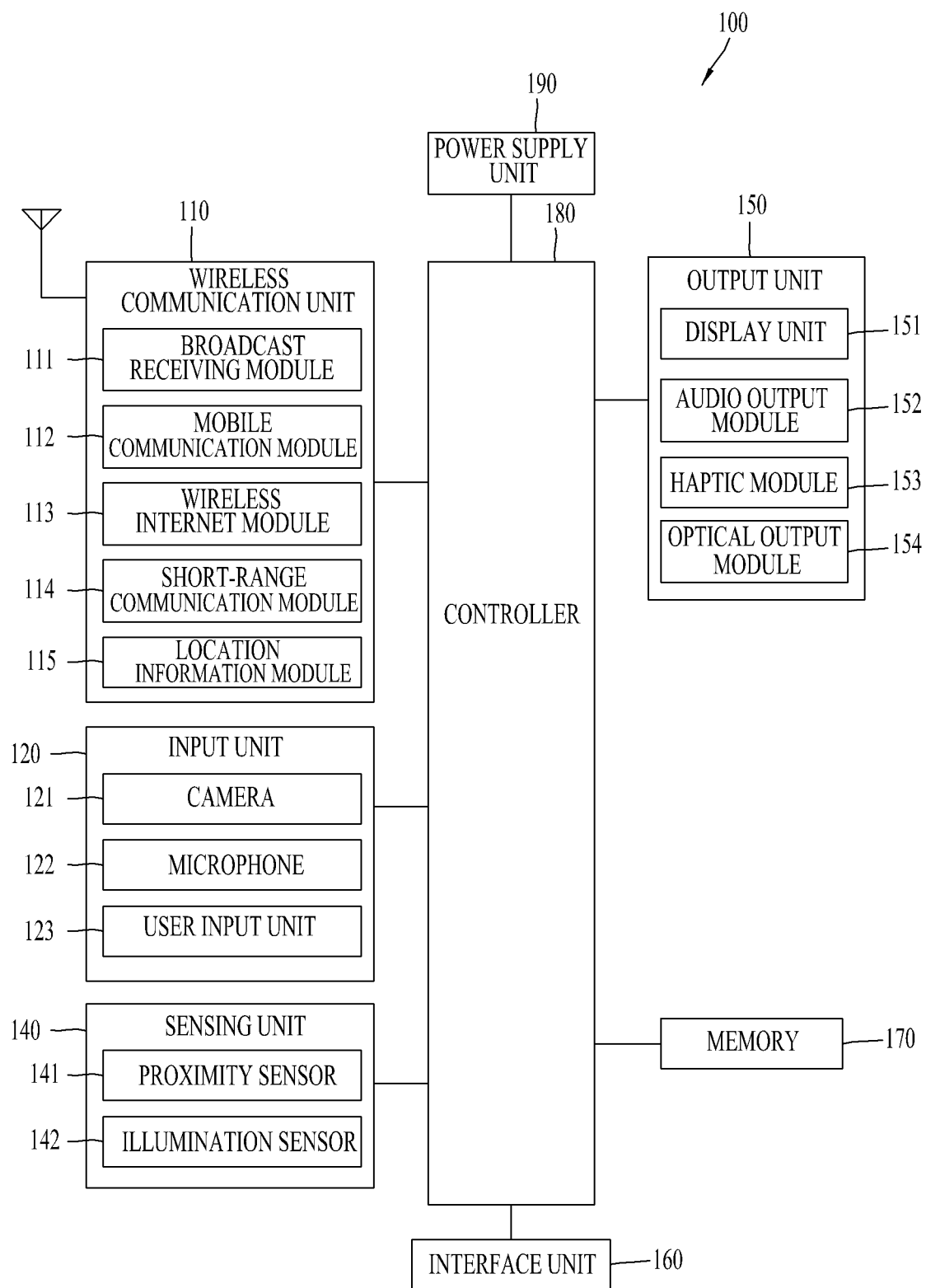
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
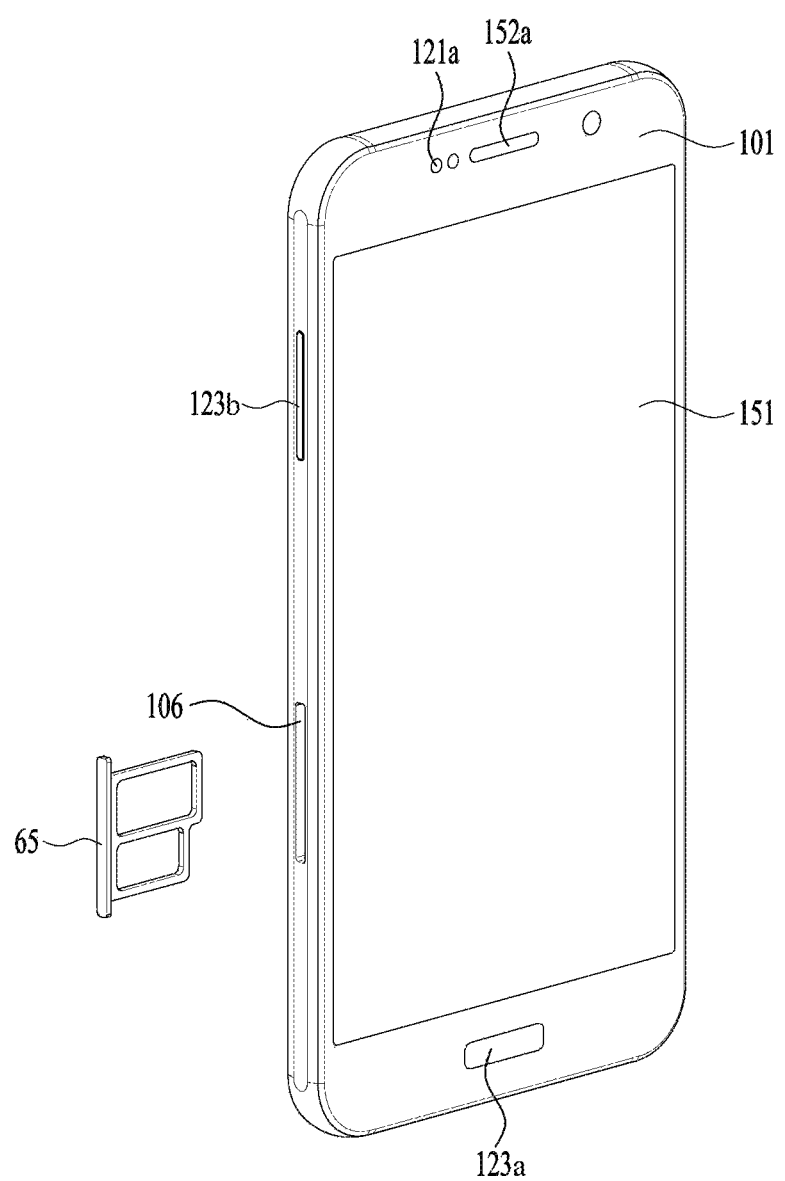
FIGS. 1B and 1C are conceptual views of one example of the mobile terminal, viewed from different directions.
Figure 1C:
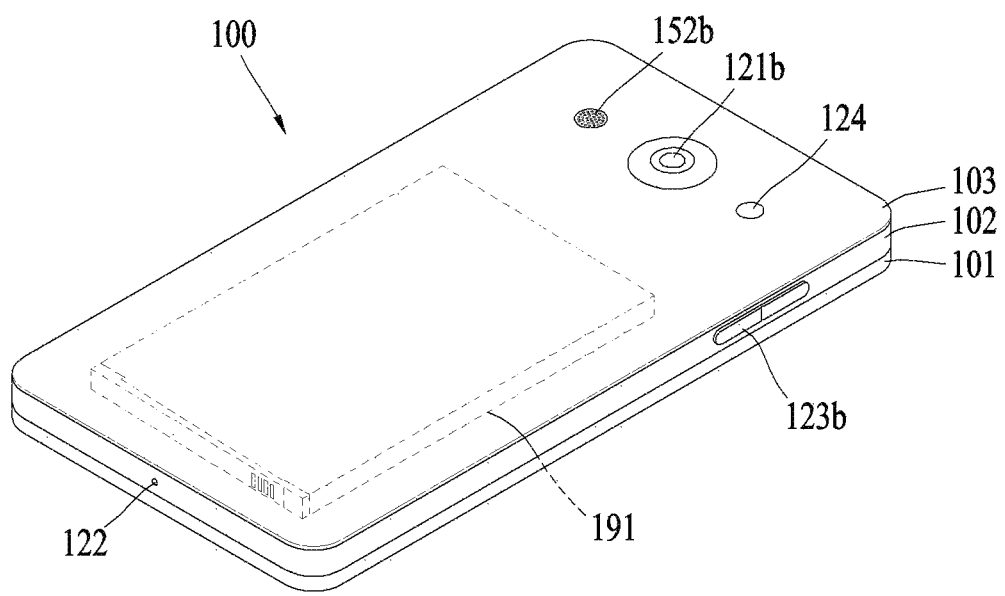

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window and the front case 101, between the front case 101 and the rear case 102, or between the rear case 102 and the rear cover 103, to hermetically seal an inner space when those cases are coupled.

The mobile terminal 100 may include the display unit 151, the first and second audio output modules 152*a* and 152*b*, the proximity sensor 141, the illuminance sensor 142, the optical output module 154, the first and second cameras 121*a* and 121*b*, the first and second manipulation units 123*a* and 123*b*, the microphone 122 and the interface unit 160.

It will be described for the mobile terminal as shown in FIGS. 1B and 1C. The display unit 151, the first audio output module 152*a*, the proximity sensor 141, an illumination sensor 142, the optical output module 154, the first camera 121*a* and the first manipulation unit 123*a* are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window and a display on a rear surface of the window, or a metal wire which is patterned directly on the rear surface of the window. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window of the display unit 151 will typically include an aperture to permit audio generated by the first audio output module 152a to pass. One alternative is to allow audio to be released along an assembly gap between the structural bodies (for example, a gap between the window and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

As the mobile terminal having a not-detachable battery cover is unable to expose a socket for loading a memory card or SIM card, a card tray 65 may be loaded in the socket.

The card tray 65 may be inserted in an opening 106 formed in the case and the inserted area of the card tray 65 may be coupled to the card socket provided in the case to be connected with the main board and the other exposed area may define a predetermined area of the mobile terminal.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

FIG. 2 (a) is a diagram illustrating a conventional card tray 65 and FIG. 2 (b) is a sectional diagram along A-A shown in FIG. 2 (a). the card tray 65 may include a support part 65a inserted in the case 101 and 102 and having a disposing portion 65d for disposing a card; a cover part 65b configured to cover the opening 106 formed in the case 101 and 102; and a waterproof part 65c made of an elastic material to prevent water from permeating between the card tray 65 and the opening 106.

As shown in FIG. 2 (b), the support part 65a and the cover part 62b of the card tray 65 may be integrally formed with each other as one body and made of a solid material (e.g., plastic). Hereinafter, the support part 65a and the cover part 62b which are integrally formed with each other will be referred to as 'the solid unit' for easy description. The waterproof part 65c may be provided as an elastic material formed in a ring shape to surround a predetermined area of the solid unit. The waterproof part 65c may be formed larger than the opening 106 enough to be insertedly fitted to the opening 106 and compressed so as to prevent water from permeating between the opening 106 and the card tray 65.

An outer area 106a is wider than an inner area 106b in the opening 106 and a step is formed in the outer area 106a and the inner area 106b. As shown in FIG. 2 (b), the opening 106 may be stepped with respect to the cover part 65b of the card tray 65. The exposed area of the cover part may have a different sectional area from the area having the waterproof part 65c.

The waterproof part 65c may be made of an elastic material but the other portion of the card tray 65 may be made of a solid material. Accordingly, the waterproof part 65c may be compressed to be deformed in the shape, while the relative positions of the support part 65b and the cover part 65a may be fixed.

Figure 3:
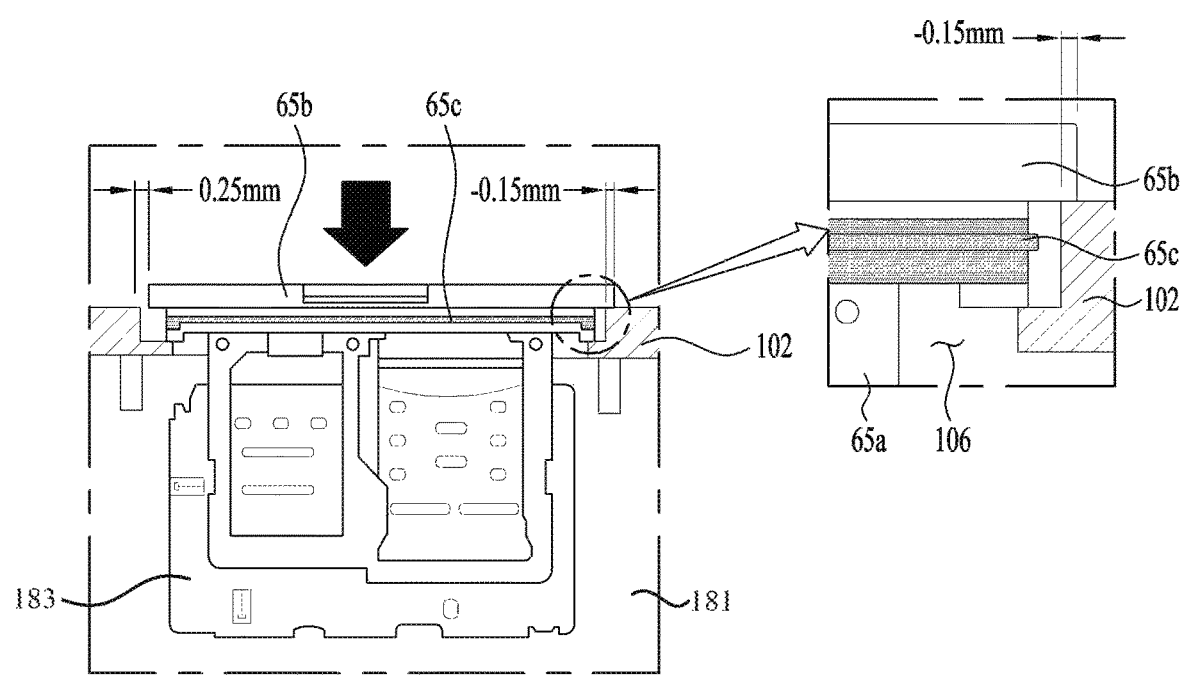
FIG. 3 is a diagram to describe an error caused by a tolerance between a conventional card socket and an opening.

FIG. 3 is a diagram to describe the error caused by the tolerance between a card socket 183 and the opening 106. The card socket 183 may be loaded in the opening 106 to guide the card tray 65 to precisely contact a terminal of the card with a terminal formed on the main board 181. The card socket 183 is coupled to the main board 181 and the main board 181 is coupled to the case 101 and 102. In this instance, the card socket 183 may be arranged in the opening 106 precisely.

However, a tolerance might occur during the coupling process of those several components and the positions of the card socket 183 and the opening 106 might become loose enough to be dislocated. When the card socket 183 is arranged 0.2 mm to the right with respect to the original position of the opening 106 as shown in FIG. 3, the support part 65b of the card tray 65 inserted in the opening 106 may be inserted in the card socket 183. At this time, the positions of the opening 106 and the card socket 183 may not match. Accordingly, the cover part 65a of the card tray 65 may be overlapped with the right area of the opening 106 by 0.15 mm to cause a problem of the failure to insert the cover part 65a in the opening 106 as shown in FIG. 3.

Such a tolerance might occur if a shock is applied to the mobile terminal 100 or a screw fastening the main board 181 becomes loose during the manufacturing process or usage of the mobile terminal. The tolerance might be a reason for raising an initial error rate or an error caused during the usage of the mobile terminal 100.

Figure 4:
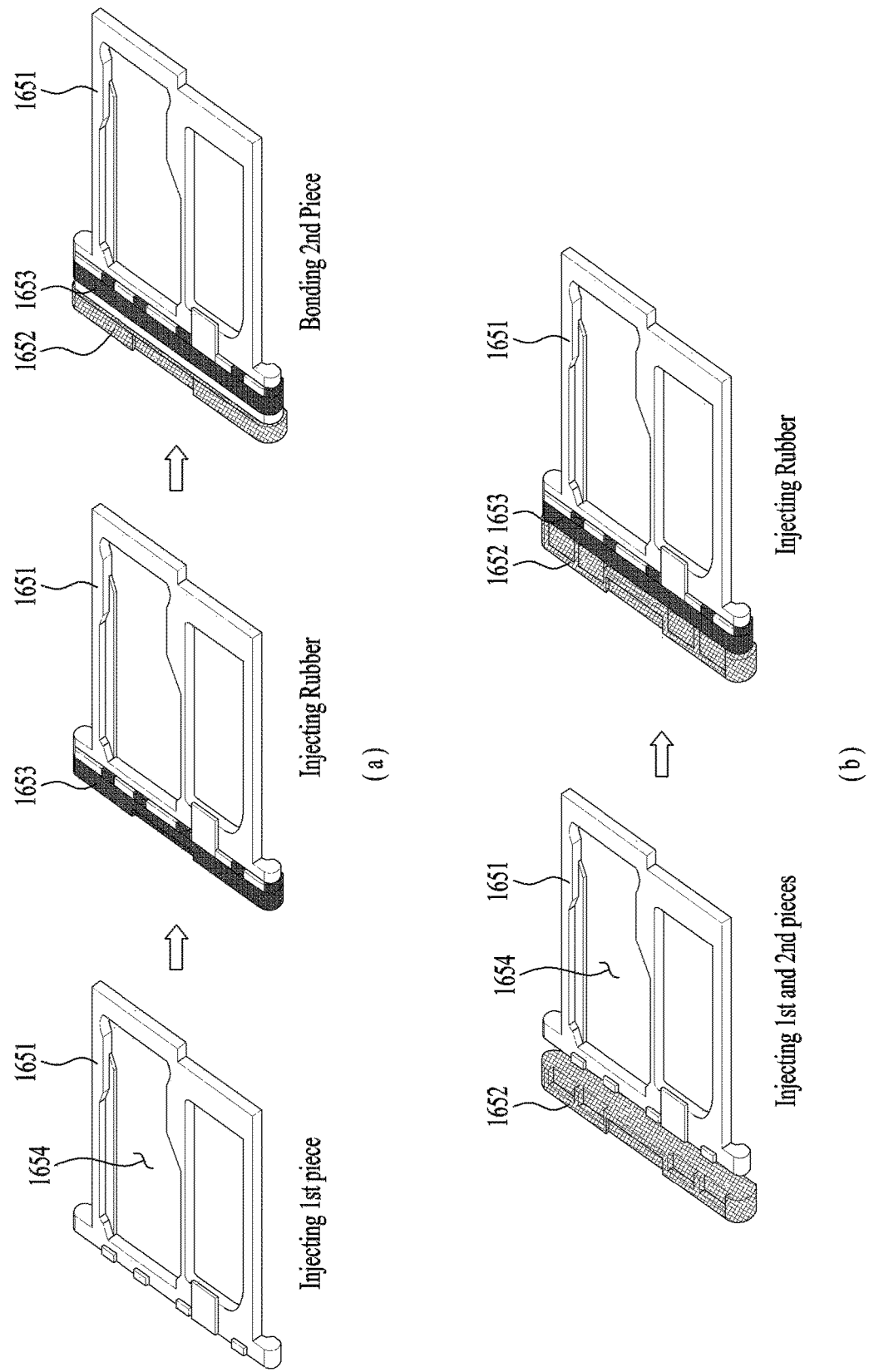
FIG. 4 is a diagram illustrating a method of manufacturing a card tray in accordance with the present disclosure.

Accordingly, the mobile terminal may include the card tray 165 configured to be inserted in the opening 106 in a preset range even if the tolerance is caused by the dislocation of the card socket 183 and the opening 106, so as to reduce the error rate. FIG. 4 is a diagram illustrating a method of manufacturing the card tray 165 in accordance with the present disclosure. FIGS. 5 and 6 are diagrams illustrating the card tray 165 of FIG. 4.

The card tray 165 may include a support part 1651, a flexible part 1653 and a cover part 1652. Different from the conventional card tray 165, the support part 1651 and the cover part 1652 may be formed independently. As shown in the sectional diagram of FIGS. 5 and 6, the support part 1651 having the disposing portion 1654 and the cover part 1652 may not be directly connected with each other. The flexible part 1653 may be provided between the support part 1651 and the cover part 1652, which is different from the conventional card tray 165.

As shown in FIG. 4 (a), the flexible part 1653 may be fabricated in the support part 1651 formed by injection-molding by using a double-injection-molding or an adhesive. After that, the cover part 1652 may be attached by using an adhesive. The cover part 65b and the support part of the conventional card 65 may be integrally formed with each other and the waterproof part 65c may be located only in the outer area on the cross sectional area. However, the support part 1651 and the cover part 1652 are completely separated from each other in the card tray 165 in accordance with the present disclosure even on the cross sectional area.

As shown in FIG. 4 (b), the support part 1651 and the cover part 1652 may be formed by the injection molding and the flexible part 1653 may be formed between the support part 1651 and the cover part 1652 by using the double-injection-molding after that. In other words, FIG. 4 (a) shows that the bolding method and the injection-molding method are mixed to fabricate the card tray 165. FIG. 4 (b) shows that the card tray 165 is fabricated by using the injection-molding method.

FIG. 5 is a diagram illustrating the card tray 165 fabricated by using the method shown in FIG. 4 (a). The support part 1651 and the flexible part 1653 are injection-molded such that an end of the support part 1651 that is in contact with the flexible part 1653 has many uneven areas. If the uneven areas of the cover part 1652 bonded to the flexible part 1653 are too complicated, it may be difficult to precisely couple the two parts to each other. The surface on which the cover part 1652 and the flexible part 1653 contacts with each other is relatively too simple. If it is too simple, the bonded surface might be separated easily and such the unevenness may be partially provided.

FIG. 6 is a diagram illustrating the card tray 165 fabricated as shown in FIG. 4 (b). as the support part 1651 and the flexible part 1653 and the flexible part 1653 and the cover part 1652 are coupled to each other by using the injection-molding, the area in contact with the cover part 1652 or the cover part 1652 and the flexible part 1653 may be coupled by injecting the soft material 1653' between the uneven areas of the support part 1651 or the cover part 1652.

The flexible part 1653 may have a changeable appearance or shape and the support part 1651 and the cover part 1652 may not be directly connected with each other. Accordingly, the relative positions of the support parts 1651 and the cover part 1652 may be variable as shown in FIGS. 5 and 6. The flexible part 1653 may be deformable without directivity, such that it may be deformable to compensate the relative positions even if the relative positions between the card socket 183 and the opening 106 are dislocated in any directions.

Figure 7:
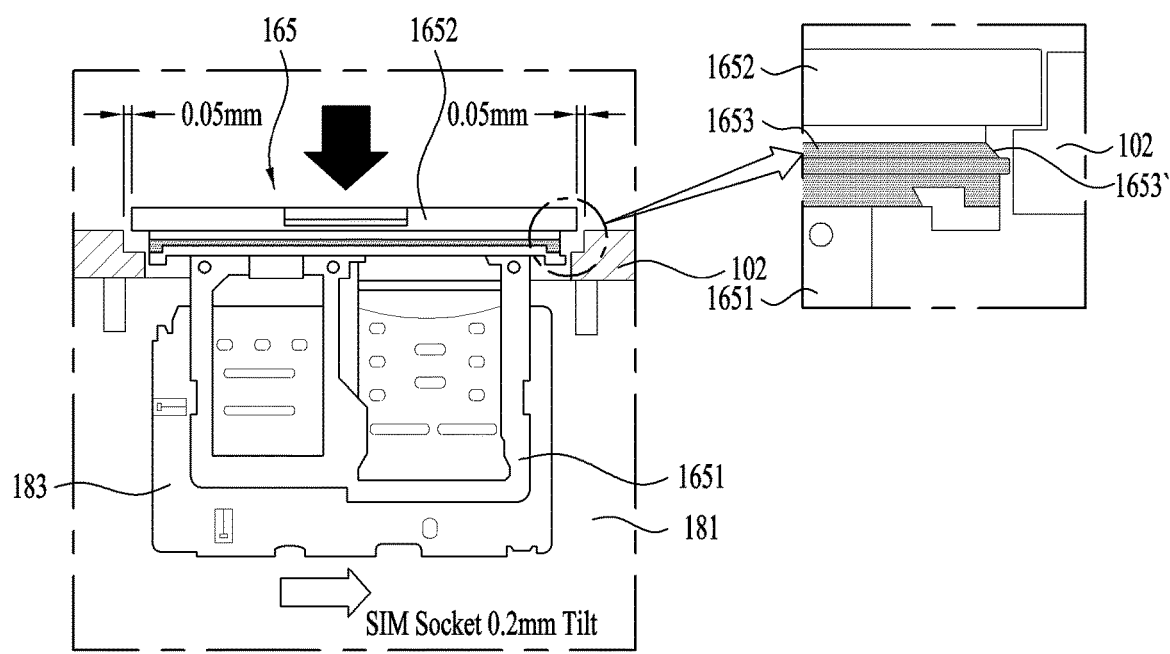
FIG. 7 is a diagram to describe the variation of the card tray shape when the tolerance occurs between the card socket and the opening.

FIG. 7 is a diagram to describe the variation of the card tray 165 shape when the tolerance occurs between the card socket 183 and the opening 106. When the center of the card socket 183 is dislocated approximately 0.2 mm from the proper position at which it matches the center of the opening 106 as mentioned above referring to FIG. 3, the support part 1651 may be arranged in response to the card socket 183 and the cover part 1652 may be arranged in response to the opening. The deformation of the flexible part 1653 may compensate the dislocation of 0.2 mm.

If the card socket 183 becomes closer to or farther from the opening 106 from the original position or closer to the front case 101 and 102 or the rear case 101 and 102, the deformation of the flexible part 1653 may compensate the dislocation as well as the right and left dislocation.

As described above, the mobile terminal may reduce an error rate by varying the positions of the cover part 1652 and the support part 1651 of the card tray 165. Accordingly, even if the position of the card socket 183 becomes loose and dislocated, the card is able to be loaded in the mobile terminal 100 and then an initial error rate and an error rate caused during the usage of the mobile terminal may be reduced.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a case comprising an opening that communicates with an inner space;
   a card socket loaded in the case to be located in the opening and having an accommodating portion; and
   a card tray inserted in the opening,
   wherein the card tray comprises:
   a cover part configured to cover the opening;
   a support part accommodated at the accommodating portion of the card socket and comprising a disposing portion in which a card is disposed; and
   a flexible part provided to connect the support part and the cover part with each other and configured to be insertedly fitted to a circumference of the opening, and
   wherein a shape of the flexible part is changed according to positions of the cover part and the support part,
   wherein a step is formed in a lateral surface of the opening and an outer area is larger than an inner area of the opening, and wherein the flexible part is insertedly fitted to the inner area of the opening.

2. The mobile terminal of claim 1, wherein one surface of the cover part and one surface of the case form the same plane, and the other surface of the cover part has an uneven area to couple the cover part to the flexible part.

3. The mobile terminal of claim 1, wherein the cover part and the flexible part are bonded to each other.

4. The mobile terminal of claim 1, wherein the cover part and the flexible part and the support part and the flexible part are double-injection molded to each other.

5. The mobile terminal of claim 1, wherein the accommodating portion forms in a corresponding shape to the support part.

* * * * *